(12) United States Patent
Nagaoka et al.

(10) Patent No.: US 9,278,313 B2
(45) Date of Patent: Mar. 8, 2016

(54) EXHAUST GAS PURIFICATION SYSTEM AND EXHAUST GAS PURIFICATION METHOD

(71) Applicant: ISUZU MOTORS LIMITED, Tokyo (JP)

(72) Inventors: Daiji Nagaoka, Kamakura (JP); Tomohiro Korenaga, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/362,733

(22) PCT Filed: Nov. 8, 2012

(86) PCT No.: PCT/JP2012/079011
§ 371 (c)(1),
(2) Date: Jun. 4, 2014

(87) PCT Pub. No.: WO2013/088869
PCT Pub. Date: Jun. 20, 2013

(65) Prior Publication Data
US 2014/0341781 A1    Nov. 20, 2014

(30) Foreign Application Priority Data

Dec. 12, 2011    (JP) .................................. 2011-271262

(51) Int. Cl.
*B01D 53/94* (2006.01)
*F01N 3/08* (2006.01)
(Continued)

(52) U.S. Cl.
CPC .......... *B01D 53/9495* (2013.01); *F01N 3/0253* (2013.01); *F01N 3/0842* (2013.01);
(Continued)

(58) Field of Classification Search
CPC ....... F01N 3/0253; F01N 3/035; F01N 3/106; F01N 3/206; F01N 3/208; F01N 2430/085; F01N 2560/06; F01N 2560/07; F01N 2610/03; F01N 2610/146; F01N 2900/0412; F01N 2900/0422; F01N 2900/1404; F01N 2900/1411

USPC .......... 60/277, 285, 286, 295, 297, 299, 301, 60/303, 311
See application file for complete search history.

(56) References Cited

U.S. PATENT DOCUMENTS

2004/0244362 A1    12/2004    Hiranuma et al.
2004/0244366 A1    12/2004    Hiranuma et al.
(Continued)

FOREIGN PATENT DOCUMENTS

CN    1532381    9/2004
CN    101208505    6/2008
(Continued)

OTHER PUBLICATIONS

Patent Abstracts of Japan, Publication No. 2001-248474, Published Sep. 14, 2001.
(Continued)

*Primary Examiner* — Thomas Denion
*Assistant Examiner* — Jorge Leon, Jr.
(74) *Attorney, Agent, or Firm* — Staas & Halsey LLP

(57) ABSTRACT

An exhaust gas purification system which feeds hydrocarbon by a post-injection under preset conditions to an upstream side of an exhaust gas purification device positioned on the exhaust path of an internal combustion engine, restoring the purifying capacity of the device or purifying the exhaust gas of the device. Under hydrocarbon feed conditions, if a combination of the exhaust gas temperature and exhaust gas flowrate or intake flowrate during control is deemed to be in a misfire region in which hydrocarbon which is fed to the exhaust path no longer combusts in the exhaust gas purification unit, the feed of hydrocarbon is stopped. As a result, it is possible to prevent deposit of hydrocarbon on catalysts or other exhaust gas purification units of the device, making it possible to constantly maintain the temperature of the unit in a controllable state.

7 Claims, 8 Drawing Sheets

(51) Int. Cl.
*F01N 3/10* (2006.01)
*F01N 9/00* (2006.01)
*F01N 3/025* (2006.01)
*F02D 41/02* (2006.01)
*F02D 41/40* (2006.01)
*F01N 13/00* (2010.01)
*F01N 3/20* (2006.01)
*F01N 3/035* (2006.01)
*F02D 41/14* (2006.01)

(52) U.S. Cl.
CPC .............. *F01N3/0871* (2013.01); *F01N 3/106* (2013.01); *F01N 3/208* (2013.01); *F01N 9/002* (2013.01); *F01N 13/0097* (2014.06); *F02D 41/029* (2013.01); *F02D 41/405* (2013.01); *F01N 3/035* (2013.01); *F01N 3/206* (2013.01); *F01N 2430/085* (2013.01); *F01N 2560/06* (2013.01); *F01N 2560/07* (2013.01); *F01N 2610/03* (2013.01); *F01N 2610/146* (2013.01); *F01N 2900/0412* (2013.01); *F01N 2900/0422* (2013.01); *F01N 2900/1404* (2013.01); *F01N 2900/1411* (2013.01); *F02D 41/1445* (2013.01); *F02D 41/1446* (2013.01); *Y02T 10/24* (2013.01); *Y02T 10/44* (2013.01); *Y02T 10/47* (2013.01)

(56) References Cited

U.S. PATENT DOCUMENTS

| | | | |
|---|---|---|---|
| 2007/0107418 A1* | 5/2007 | Colignon | 60/295 |
| 2008/0060347 A1* | 3/2008 | Tominaga et al. | 60/284 |
| 2009/0044517 A1 | 2/2009 | Oba | |
| 2010/0250090 A1* | 9/2010 | Jasinkiewicz et al. | 701/102 |
| 2010/0300074 A1* | 12/2010 | Mullins et al. | 60/286 |
| 2012/0060480 A1* | 3/2012 | Tanaka | 60/286 |
| 2012/0090303 A1* | 4/2012 | Numata et al. | 60/287 |
| 2013/0047582 A1* | 2/2013 | Gonze et al. | 60/274 |
| 2013/0245918 A1* | 9/2013 | Douglas et al. | 701/103 |

FOREIGN PATENT DOCUMENTS

| | | | | |
|---|---|---|---|---|
| EP | 1 680 584 B1 | 12/2008 | | |
| JP | 2001-248474 | 9/2001 | | |
| JP | 2001248474 A | * 9/2001 | | F02D 41/04 |
| JP | 2004-293340 | 10/2004 | | |
| JP | 2007-510843 | 4/2007 | | |
| JP | 2009-13842 | 1/2009 | | |
| JP | 2009013842 A | * 1/2009 | | |
| JP | 2011-153591 | 8/2011 | | |

OTHER PUBLICATIONS

Delphion Abstract, Publication No. EP 1 680 584 B1, Published Dec. 31, 2008.
Patent Abstracts of Japan, Publication No. 2009-013842, Published Jan. 22, 2009.
Patent Abstracts of Japan, Publication No. 2011-153591, Published Aug. 11, 2011.
International Search Report mailed Dec. 4, 2012 in corresponding International Patent Application No. PCT/JP2012/079011.

* cited by examiner

Fig. 2

| Exhaust Gas Flow Rate | g/s | 0 | 10 | 20 | 25 | 30 | 35 | 50 | 80 | 110 |
|---|---|---|---|---|---|---|---|---|---|---|
| Activation Threshold | °C | 190 | 195 | 205 | 245 | 260 | 263 | 270 | 280 | 290 |
| Feed Start Threreshold | °C | 220 | 225 | 235 | 275 | 290 | 293 | 300 | 310 | 320 |
| Intermediate Region Width | °C | 30 | 30 | 30 | 30 | 30 | 30 | 30 | 30 | 30 |
| Feed Stop Thershold | °C | 190 | 195 | 205 | 245 | 260 | 263 | 270 | 280 | 290 |

Fig. 7

| Exhaust Gas Flow Rate | g/s | 0 | 10 | 20 | 25 | 30 | 35 | 50 | 80 | 110 |
|---|---|---|---|---|---|---|---|---|---|---|
| Activation Threshold | °C | 190 | 195 | 205 | 245 | 260 | 263 | 270 | 280 | 290 |
| Feed Start Threreshold | °C | 205 | 210 | 220 | 260 | 275 | 278 | 285 | 295 | 305 |
| Intermediate Region Width | °C | 30 | 30 | 30 | 30 | 30 | 30 | 30 | 30 | 30 |
| Feed Stop Thershold | °C | 170 | 180 | 190 | 230 | 245 | 248 | 255 | 265 | 275 |

EXHAUST GAS PURIFICATION SYSTEM AND EXHAUST GAS PURIFICATION METHOD

CROSS-REFERENCE TO RELATED APPLICATIONS

This application claims the foreign priority benefit of Japanese Application No. 2011-271262 filed Dec. 12, 2011, the contents of which are incorporated herein by reference, which serves as priority for PCT Application No. PCT/JP2012/079011 filed Nov. 8, 2012.

BACKGROUND OF THE INVENTION

The present invention relates to an exhaust gas purification system and an exhaust gas purification method which make it possible to prevent an unburned hydrocarbon from being adsorbed into an exhaust gas purification unit, such as a diesel particulate filter ("DPF") or a catalyst, for purifying exhaust gas from an internal combustion engine and maintain the temperature of the exhaust gas purification unit always in a controllable state.

An exhaust gas purification system for an internal combustion engine, such as a diesel engine, mounted on a vehicle is provided with a device using a DPF unit for removing particulate matter (PM) in exhaust gas, or an exhaust gas purification device including a lean NOx trap catalyst (LNT catalyst) unit in which a NOx storage reduction catalyst, a selective reduction catalyst (SCR), or the like is supported for removing nitrogen oxides (NOx) by reduction in a lean atmosphere.

For the DPF unit, the following method for recovering a PM collection ability is employed. Specifically, when a PM collection limit is approached, forced regeneration is performed in which the temperature of the exhaust gas is raised to combust and remove PM collected in the DPF unit. Thus, the PM deposited in the DPF unit is combusted and removed. For raising the temperature of the exhaust gas in the forced regeneration, post injection is performed by in-cylinder fuel injection after a piston passes a top dead center, and unburned fuel injected by the post injection is fed into an exhaust passage, or hydrocarbons (HC), which are unburned fuel, are fed into an exhaust passage by injecting fuel directly into the exhaust path from a fuel injection device provided in the exhaust passage. The hydrocarbons are oxidized in an oxidation catalyst unit of the exhaust gas purification device, and the exhaust gas whose temperature is raised by the heat of the oxidation is sent to the DPF unit. Thus, the temperatures of the DPF unit and the PM collected in the DPF unit are raised to be not lower than a temperature at which the PM can be combusted. In this manner, PM is combusted and removed.

Meanwhile, for the exhaust gas purification unit using a NOx storage reduction catalyst, the following method is employed. Specifically, in a rich control for recovering a NOx storage ability, post injection or direct fuel injection into an exhaust passage is employed, and hydrocarbons are combusted in an oxidation catalyst unit or the like to consume oxygen in the exhaust gas and raise the temperature of the exhaust gas. Then, the exhaust gas is fed to the NOx storage reduction catalyst to convert the surface state of the NOx storage reduction catalyst to a rich and high-temperature state. Thus, NOx occluded in the NOx storage reduction catalyst is released, and also the released NOx is reduced by a catalytic action.

In addition, for an exhaust gas purification unit using a hydrocarbon selective reduction catalyst (HC-SCR catalyst) for removing NOx, the following method is employed. Specifically, hydrocarbons such as fuel are injected to an upstream side of the hydrocarbon selective reduction catalyst by direct fuel injection into an exhaust passage, and the hydrocarbons are used as a reducing agent to reduce NOx in the exhaust gas by a selective reduction catalyst.

As described above, in some exhaust gas purification methods for exhaust gas purification systems provided with exhaust gas purification devices for purifying exhaust gas, hydrocarbons, which are fuel for internal combustion engines such as light oil, are fed to the upstream side of the exhaust gas purification devices, which are provided with an oxidation catalyst unit, a DPF unit, or a lean NOx catalyst unit in which a NOx storage reduction catalyst, a hydrocarbon selective reduction catalyst, or the like is supported, under predetermined hydrocarbon feed conditions preset respectively for the exhaust gas purification units at their respective timings and in their respective feed amounts.

However, there is a problem that when hydrocarbons are added in a case where the exhaust gas temperature is not higher than the activation start temperature (light-off temperature) of hydrocarbons in each of the exhaust gas purification units, the hydrocarbons are not combusted on the catalyst, but adsorbed into the catalyst.

Moreover, by way of many experiments, the present inventors have found that, even in a case where the exhaust gas temperature is near the activation start temperature and hydrocarbons are being combusted, if the flow rate of the exhaust gas increases because of acceleration of the vehicle on which an internal combustion engine is mounted or the like, the flame of the combustion is blown out and a misfiring phenomenon occurs in some cases.

It is also found that the HC-poisoned catalyst due to adsorption of the unburned hydrocarbons undergoes a phenomenon in which when a state where hydrocarbons are not combusted is shifted to a state where the exhaust gas temperature rises to a temperature not lower than the activation start temperature, the hydrocarbons are combusted at once and the state becomes uncontrollable. In this state, the temperature of the catalyst rises abnormally, causing degradation of the catalyst or dissolution loss of the DPF. In addition, this phenomenon may also occur in a desulfurization control of a lean NOx trap catalyst (LNT catalyst).

In this respect, as described in Japanese patent application Kokai publication No. 2011-153591 (Patent Document 1), an exhaust gas treatment method and device for an internal combustion engine are proposed in order to prevent abnormal combustion in a DPF filter occurring in an exhaust gas treatment device provided with a pre-stage oxidation catalyst and a DPF filter in a exhaust gas passage of an internal combustion engine when the state of the internal combustion engine changes from a high-load state to a low-load state. Specifically, in the method and device, when operation which may cause abnormal combustion in the DPF is detected, an intake air throttle valve is fully opened to increase the exhaust gas flow rate. Thus, the DPF filter device is cooled by taking heat away by sensible heat of the exhaust gas, and the oxygen concentration around the DPF filter is lowered by continuing late post injection, so that abnormal combustion of PM collected in the DPF filter is suppressed.

In this case, the abnormal combustion of PM collected by the DPF filter is suppressed, which is different from the above-described abnormal combustion of hydrocarbons. However, the above-described abnormal combustion of hydrocarbons is highly likely to cause abnormal combustion of PM collected in a DPF filter. This indicates the importance of suppression of the abnormal combustion in an exhaust gas purification unit.

PRIOR ART DOCUMENT

Patent Document 1: Japanese patent application Kokai publication No. 2011-153591

SUMMARY OF THE INVENTION

The present invention has been made in view of the above-described circumstances, and an object of the present invention is to provide an exhaust gas purification system and an exhaust gas purification method which make it possible to prevent a hydrocarbon from being adsorbed into an exhaust gas purification unit and maintain the temperature of the exhaust gas purification unit always in a controllable state in the exhaust gas purification system in which a purification ability of an exhaust gas purification device is recovered or exhaust gas is purified, by feeding a hydrocarbon (HC) to an upstream side of an exhaust gas purification device disposed in an exhaust passage of an internal combustion engine by in-cylinder post fuel injection or exhaust passage direct injection under a preset hydrocarbon feed condition, and combusting the hydrocarbon in an exhaust gas purification unit such as a catalyst or a DPF of the exhaust gas purification device.

An exhaust gas purification system of the present invention to achieve the above-described object includes:
  an exhaust gas purification device which is disposed in an exhaust passage of an internal combustion engine and part or all of which is constituted of an exhaust gas purification unit; and
  a controlling device being configured to perform a control for recovering a purification ability of the exhaust gas purification device or a control for purifying exhaust gas, by feeding a hydrocarbon to an upstream side of the exhaust gas purification device by in-cylinder post fuel injection or exhaust passage direct injection under a preset hydrocarbon feed condition, and combusting the hydrocarbon in the exhaust gas purification unit, wherein
  the controlling device is configured to
    preset an activation threshold line of exhaust gas flow rate or intake air flow rate with respect to exhaust gas temperature of the internal combustion engine, the activation threshold line serving as a boundary between an active region where the hydrocarbon fed into the exhaust passage can be combusted in the exhaust gas purification unit and a misfire region where the hydrocarbon fed into the exhaust passage cannot be combusted in the exhaust gas purification unit, and
    find an exhaust gas temperature as well as an exhaust gas flow rate or an intake air flow rate during control under the hydrocarbon feed condition, determine whether a combination of the exhaust gas temperature with the exhaust gas flow rate or the intake air flow rate is within the active region or the misfire region, and perform such a control that if the combination is determined to be within the active region, it is decided to feed the hydrocarbon, and the hydrocarbon is fed, whereas if the combination is determined to be within the misfire region, it is decided to stop the feed of the hydrocarbon, and the feed of the hydrocarbon is stopped.

According to this configuration, the activation threshold line for determining the start and the stop of the feed of the hydrocarbon is set based on the combination of the exhaust gas temperature and the exhaust gas flow rate (or the intake air flow rate) not only the inlet exhaust gas temperature or the catalyst temperature of an exhaust gas purification unit such as a catalyst or a DPF. Hence, the start and the stop of the feed of the hydrocarbon can be determined more accurately than the case where the determination is made based on only a temperature such as the exhaust gas temperature, because the misfiring phenomenon due to the exhaust gas flow rate (or the intake air flow rate) can be taken into consideration.

In other words, even at the same exhaust gas temperature, the feed of the hydrocarbon is performed in some cases but is not performed in other cases depending on the exhaust gas flow rate (or the intake air flow rate). To put it differently, a threshold of the exhaust gas flow rate is set for the same exhaust gas temperature, while a threshold of the exhaust gas temperature is set for the same exhaust gas flow rate. The relationship between the thresholds of the exhaust gas temperature and the exhaust gas flow rate (or the intake air flow rate) for determining whether the feed of the hydrocarbon is performed or stopped is set in the form of a two-dimensional table, two-dimensional map data, a function, or the like of the thresholds, in which the exhaust gas temperature and the exhaust gas flow rate (or the intake air flow rate) serve as parameters.

For this reason, the fed hydrocarbon remaining unburned can be prevented from being adsorbed into the exhaust gas purification unit. Consequently, at a time point where the feed of the hydrocarbon is resumed, i.e., at a time point a state where the unburned hydrocarbon can be combusted is reached, unburned hydrocarbon is not adsorbed in the exhaust gas purification unit. Hence, it is possible to block the thermal runaway due to abnormal combustion of the hydrocarbon caused by the adsorbed and unburned hydrocarbon, and maintain the temperature of the exhaust gas purification unit always in a controllable state.

In addition, since the start of the feed of the hydrocarbon can be determined accurately, it is possible to avoid degradation of the purification ability of the exhaust gas purification device and delay in recovery of the purification ability due to shortage of the fed hydrocarbon.

The controlling device in the above-described exhaust gas purification system may be configured to
  set an intermediate region between the active region and the misfire region by providing a width at the boundary between the active region and the misfire region, and employ a border line of the active region side of the intermediate region as a feed start threshold line and a border line of the misfire region side of the intermediate region as a feed stop threshold line, and
  perform such a control that
    when the combination of the exhaust gas temperature with the exhaust gas flow rate or the intake air flow rate during control moves from the misfire region side to the active region side, it is decided to feed the hydrocarbon at a time point where the combination passes the feed start threshold line, and the hydrocarbon is fed, whereas
    when the combination moves from the active region side to the misfire region side, it is decided to stop the feed of the hydrocarbon at a time point where the combination passes the feed stop threshold line, and the feed of the hydrocarbon is stopped.

In this case, the progress of the state during control can be taken into consideration for determining whether the state (combination) during control is within the active region or the misfire region, and hence the feed and stop of the hydrocarbon can be controlled more accurately.

Moreover, the controlling device in the above-described exhaust gas purification system may be configured to perform such a control that a preset start delay time is allowed to elapse between the decision to feed the hydrocarbon based on the combination of the exhaust gas temperature with the exhaust gas flow rate or the intake air flow rate during control and the start of the feed of the hydrocarbon, and perform such a control that a preset stop delay time is allowed to elapse between the decision to stop the feed of the hydrocarbon and the stop of the feed of the hydrocarbon.

In this case, the time delay is introduced into the control of the start or stop of the feed of the hydrocarbon with the heat capacity of the exhaust gas purification unit in which the fed hydrocarbon is combusted being taken into consideration, and hence the feed and stop of the hydrocarbon can be performed at more appropriate timings.

Meanwhile, an exhaust gas purification method to achieve the above-described object is a method in which a purification ability of an exhaust gas purification device is recovered or exhaust gas is purified in the exhaust gas purification device, by feeding a hydrocarbon to an upstream side of the exhaust gas purification device, which is disposed in an exhaust path of an internal combustion engine, by in-cylinder post fuel injection or exhaust passage direct injection under a preset hydrocarbon feed condition, and combusting the hydrocarbon in an exhaust gas purification unit which constitutes part or all of the exhaust gas purification device, the method comprising:

presetting an activation threshold line of exhaust gas flow rate or intake air flow rate with respect to exhaust gas temperature of the internal combustion engine, the activation threshold line serving as a boundary between an active region where the hydrocarbon fed into the exhaust passage can be combusted in the exhaust gas purification unit and a misfire region where the hydrocarbon fed into the exhaust passage cannot be combusted in the exhaust gas purification unit, and finding an exhaust gas temperature as well as an exhaust gas flow rate or an intake air flow rate during control under the hydrocarbon feed condition, determining whether a combination of the exhaust gas temperature with the exhaust gas flow rate or the intake air flow rate is within the active region or the misfire region, and if the combination is determined to be within the active region, deciding to feed the hydrocarbon, and feeding the hydrocarbon, whereas if the combination is determined to be within the misfire region, deciding to stop the feed of the hydrocarbon, and stopping the feed of the hydrocarbon.

In this method, the activation threshold line for determining the start and the stop of the feed of the hydrocarbon is set based on the combination of the exhaust gas temperature and the exhaust gas flow rate (or the intake air flow rate) not only the inlet exhaust gas temperature or the catalyst temperature of an exhaust gas purification unit such as a catalyst or a DPF. Hence, the start and the stop of the feed of the hydrocarbon can be determined more accurately than the case where the determination is made based on only a temperature such as the exhaust gas temperature, because the misfiring phenomenon due to the exhaust gas flow rate (or the intake air flow rate) can be taken into consideration.

In addition, the exhaust gas purification method may be as follows. Specifically, an intermediate region is set between the active region and the misfire region by providing a width at a boundary between the active region and the misfire region, and a border line of the active region side of the intermediate region is employed as a feed start threshold line, while a border line of the misfire region side of the intermediate region is employed as a feed stop threshold line. In addition, when the combination of the exhaust gas temperature with the exhaust gas flow rate or the intake air flow rate during control moves from the misfire region side to the active region side, it is decided to feed the hydrocarbon at a time point where the combination passes the feed start threshold line, and the hydrocarbon is fed. Meanwhile, when the combination moves from the active region side to the misfire region side, it is decided to stop the feed of the hydrocarbon at a time point where the combination passes the feed stop threshold line, and the feed of the hydrocarbon is stopped. In this case, the progress of the state during control can be taken into consideration for determining whether the state (combination) during control is within the active region or the misfire region, and hence the feed and stop of the hydrocarbon can be controlled more accurately.

Moreover, the exhaust gas purification method may be as follows. Specifically, a preset start delay time is allowed to elapse between the entry of the combination of the exhaust gas temperature with the exhaust gas flow rate or the intake air flow rate during control into the active region side and the start of the feed of the hydrocarbon, whereas a preset stop delay time is allowed to elapse between the entry of the combination into the misfire region side and the stop of the feed of the hydrocarbon. In this case, the time delay is introduced into the control of the start or stop of the feed of the hydrocarbon with the heat capacity of the exhaust gas purification unit in which the fed hydrocarbon is combusted being taken into consideration, and hence the feed and stop of the hydrocarbon can be performed at more appropriate timings.

In an exhaust gas purification system in which a purification ability of an exhaust gas purification device is recovered or exhaust gas is purified, by feeding a hydrocarbon (HC) to an upstream side of an exhaust gas purification device, which is disposed in an exhaust passage of an internal combustion engine, by in-cylinder post fuel injection or exhaust passage direct injection under a preset hydrocarbon feed condition and combusting the hydrocarbon in an exhaust gas purification unit such as a catalyst or a DPF of the exhaust gas purification device, the exhaust gas purification system and the exhaust gas purification method according to the present invention make it possible to prevent the hydrocarbon from being adsorbed into the exhaust gas purification unit and maintain the temperature of the exhaust gas purification unit always in a controllable state.

Hence, in a vehicle on which an internal combustion engine employing the exhaust gas purification system is mounted, a forced regeneration control of particulate matter (PM) collected by a DPF, forced regeneration and desulfurization controls involving an air-fuel ratio rich control for recovery of a purification ability of a lean NOx trap catalyst (LNT) catalyst, or a NOx reduction control by a hydrocarbon selective reduction catalyst (HC-SCR catalyst) can be performed in a stable temperature state even in an operation where the vehicle is switched from deceleration to acceleration.

BRIEF DESCRIPTION OF THE DRAWINGS

FIG. 2 shows an example of activation thresholds of exhaust gas temperature and exhaust gas flow rate, intermediate region width, feed stop threshold, and feed start threshold in the form of a table.

FIG. 7 shows another example of activation thresholds of exhaust gas temperature and exhaust gas flow rate, intermediate region width, feed stop threshold, and feed start threshold in the form of a table.

DETAILED DESCRIPTION

Figure 1:
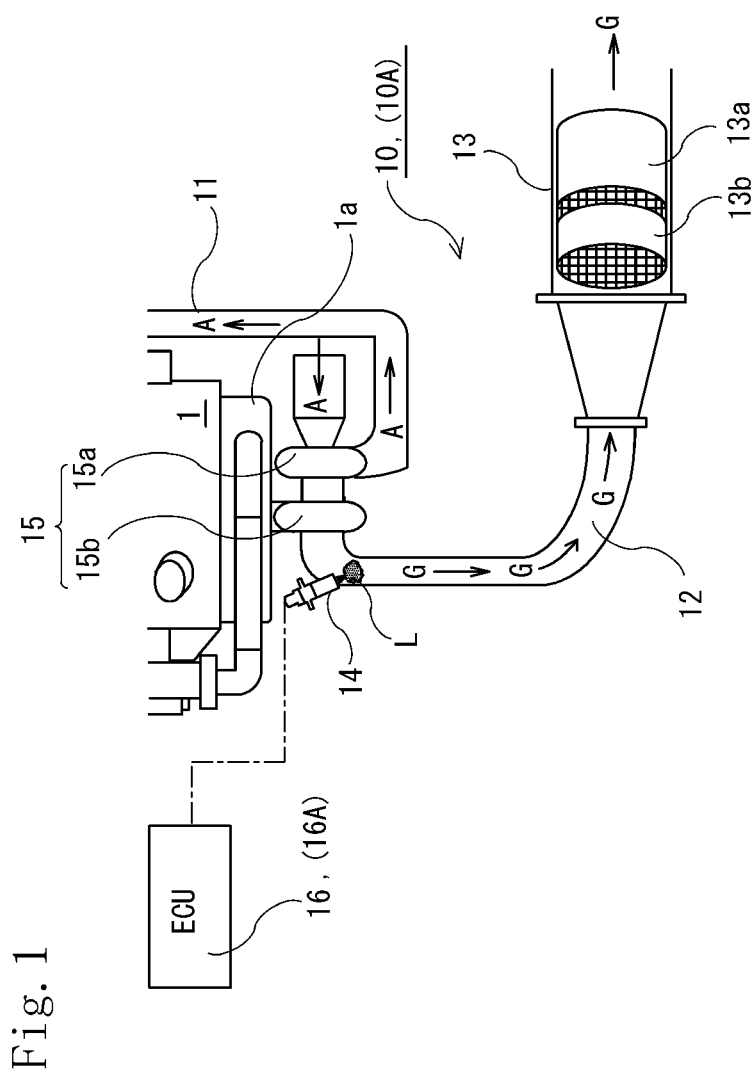
FIG. 1 is a diagram showing a configuration of an exhaust gas purification system of an embodiment of the present invention.

Hereinafter, an exhaust gas purification system and an exhaust gas purification method of embodiments according to the present invention are described with reference to the drawings. As shown in FIG. 1, an exhaust gas purification system 10 of this embodiment is an exhaust gas purification system disposed in an exhaust passage 12 connected to an exhaust manifold 1a of an engine (internal combustion engine) 1. In this exhaust gas purification system 10, a hydrocarbon feed device 14 is provided on an upstream side of an exhaust gas purification device 13.

This exhaust gas purification device 13 is selected from several types of exhaust gas purification devices depending on a state of exhaust gas of the engine 1 on which the exhaust gas purification system 10 is mounted and the like. As the exhaust gas purification device 13, an exhaust gas purification unit is employed such as a diesel particulate filter (DPF) unit for removing particulate matter (PM) in exhaust gas G, a NOx storage reduction catalyst unit for removing nitrogen oxides (NOx) by reduction in an lean atmosphere, or a selective reduction catalyst (SCR) unit also for removing nitrogen oxides (NOx) by reduction in a lean atmosphere. In the configuration of FIG. 1, a combination of a DPF unit 13a and an oxidation catalyst unit 13b on the upstream side (preceding stage) thereof is employed.

Here, a timing (a preset hydrocarbon feed condition) of feed of a hydrocarbon L fed form the hydrocarbon feed device 14 varies depending on the type of the exhaust gas purification device 13. When the combination of the DPF unit 13a and the oxidation catalyst unit 13b is used as the exhaust gas purification device 13, the feed of the hydrocarbon L is performed in the forced regeneration for forcibly combusting and removing PM collected by the DPF unit 13a.

Meanwhile, when a NOx storage reduction catalyst unit, which is one of the lean NOx trap catalysts (LNT catalysts), is used in the exhaust gas purification device 13, the feed of the hydrocarbon L is performed in a NOx regeneration control in which the air-fuel ratio in the exhaust gas is controlled to a rich state to recover the NOx storage ability and moreover in a sulfur purge control in which the air-fuel ratio in the exhaust gas is controlled to a rich state to recover the NOx storage ability from sulfur poisoning. Also in this case, an oxidation catalyst unit is often provided between the NOx storage reduction catalyst unit and the hydrocarbon feed device 14.

In addition, when a hydrocarbon selective reduction catalyst (HC-SCR catalyst) unit is used in the exhaust gas purification device 13, the feed of the hydrocarbon L is performed almost always to reduce NOx in the exhaust gas.

Note that, in the following description, a case where the exhaust gas purification device 13 is constituted of the combination of the DPF device 13a and the oxidation catalyst 13b as shown in FIG. 1 is described. However, the exhaust gas purification device 13 may be constituted of other exhaust gas purification units as those described above. In addition, here, the hydrocarbon L is fed into the exhaust passage 12 by the hydrocarbon feed device 14. However, the present invention can also be applied in a case where the hydrocarbon L is fed into the exhaust passage 12 by in-cylinder post fuel injection.

In the engine 1, the pressure of intake air A passing through an intake passage 11 is raised with a compressor 15a of a turbo charger 15. Then, the intake air A is fed into a cylinder of the engine 1, and combusts a fuel fed also into the cylinder to form the exhaust gas G. If necessary, the exhaust gas G is partially used for exhaust gas recirculation (EGR), and the remaining part is guided from the exhaust manifold 11a to the exhaust passage 12, drives a turbine 15b of the turbo charger 15, and then flows into the exhaust gas purification device 13, in which the exhaust gas G is purified.

Moreover, a controlling device 16 is provided to which measurement signals are inputted from a differential pressure sensor for measuring a differential pressure across the DPF unit 13b, a temperature sensor for measuring an exhaust gas temperature, an intake air amount sensor (air mass flow sensor: MAF sensor) for measuring an intake air flow rate, and the like, which are not shown in the drawing. Based on these measurement signals, the differential pressure, the exhaust gas temperature, and the intake air flow rate are determined. Moreover, an exhaust gas flow rate is calculated from the intake air flow rate and a fuel injection amount. In a case of the present invention, the difference between the exhaust gas flow rate and the intake air flow rate is the difference between the amount of oxygen consumed in the oxidation of the fuel and the amount of the exhaust gas generated. Hence, the intake air flow rate can be used instead of the exhaust gas flow rate. The use of the intake air flow rate eliminates the need for the calculation of the amount of the fuel consumed and the amount of the exhaust gas, enabling reduction in amount of operation by the controlling device 16.

The controlling device 16 is configured to perform such a control that the hydrocarbon L is fed to the upstream side of the exhaust gas purification device 13 by exhaust passage direct injection from the hydrocarbon feed device 14 under a preset hydrocarbon feed condition, and the hydrocarbon L is combusted in an exhaust gas purification unit (here, the oxidation catalyst unit 13b) constituting part or all of the exhaust gas purification device 13 to recover a purification ability of the exhaust gas purification device 13.

Figure 3:
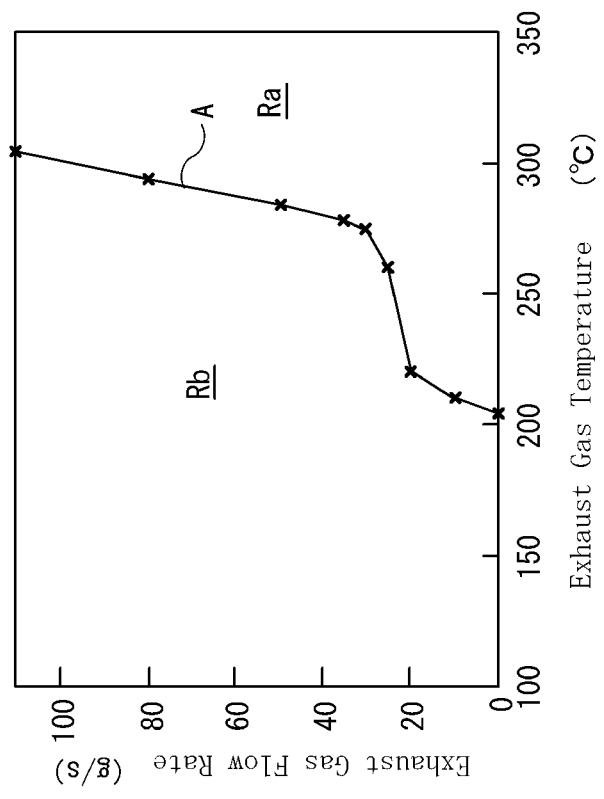
FIG. 3 shows an example of combinations of exhaust gas temperature and exhaust gas flow rate, an activation threshold line, an active region, and a misfire region in the form of a graph.

Moreover, the controlling device 16 is configured to perform the following control. Specifically, the controlling device 16 presets an activation threshold line A of the exhaust gas flow rate (or the intake air flow rate) with respect to the exhaust gas temperature of the engine 1 as shown by the activation threshold on the Table of FIG. 2, i.e., by line A in the graph of FIG. 3. Here, the activation threshold line A serves as a boundary between an active region Ra in which the hydrocarbon L fed into the exhaust path 12 can be combusted in the oxidation catalyst unit 13b and a misfire region Rb in which the hydrocarbon L fed into the exhaust path 12 cannot be combusted in the exhaust gas purification unit 13b.

In addition, the controlling device 16 is configured to find an exhaust gas temperature and an exhaust gas flow rate (or an intake air flow rate) during control under a hydrocarbon feed condition (here, under a forced regeneration control condition of the DPF unit 13b), determine whether the combination is within the active region Ra or the misfire region Rb, and perform such a control that if the combination is determined to be within the active region Ra, it is decided to feed the hydrocarbon L, and the hydrocarbon L is fed, whereas if the combination is determined to be within the misfire region Rb, it is decided to stop the feed of the hydrocarbon L, and the feed of the hydrocarbon L is stopped.

In other words, the hydrocarbon is fed when the exhaust gas flow rate becomes smaller than that indicated by the activation threshold line A at the exhaust gas temperature during control and reaches the active region Ra, whereas the feed of the hydrocarbon is stopped when the exhaust gas flow rate becomes larger than that indicated by the activation threshold line A at the exhaust gas temperature and reaches the misfire region Rb. Conversely, the hydrocarbon is fed when the exhaust gas temperature becomes higher than that indicated by the activation threshold line A and reaches the active region Ra, whereas the feed of hydrocarbon is stopped when the exhaust gas temperature becomes lower than that indicated by the activation threshold line A and reaches the misfire region Rb.

Figure 4:
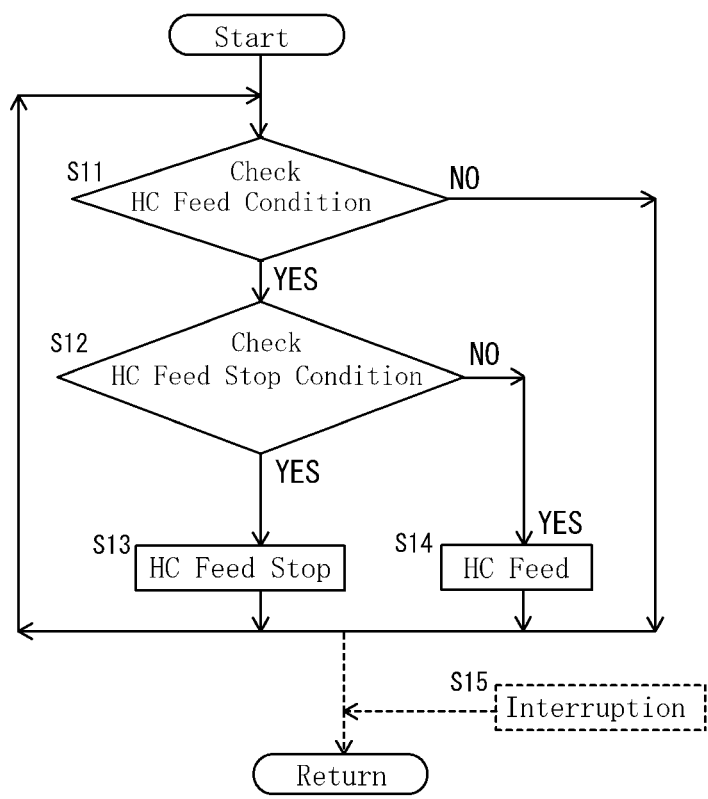
FIG. 4 shows an example of a control flow showing a control flow of an exhaust gas purification method of a first embodiment of the present invention.

This is described with reference to a control flow of FIG. 4. When the operation of the engine 1 is started, a control flow of FIG. 4 is also invoked by an upper level control flow and started. When this control flow is started, it is determined whether or not the state is under a hydrocarbon (HC) feed condition, in Step S11. When the state is not under the hydrocarbon feed condition, the process returns to Step S11, after a preset time (a time associated with intervals between determinations) has elapsed.

When the determination in Step S11 shows that the state is under the hydrocarbon feed condition, the process proceeds to Step S12. In Step S12, it is determined whether the state is under a hydrocarbon feed stop condition, i.e., whether the state is in the active region Ra (NO) or in the misfire region Rb (YES). If the state is in the active region Ra (NO), it is decided to feed the hydrocarbon L, and the process proceeds to Step S14, where the hydrocarbon is fed for a preset time (a time associated with intervals of determinations). On the other hand, the determination in Step S12 shows that the state is in the misfire region Rb (YES), it is decided to stop the feed of the hydrocarbon L, and the process proceeds to Step S13, where the feed of the hydrocarbon is stopped for a preset time (a time associated with intervals of determinations).

These operations are repeated. When the engine 1 stops its operation, an interruption of Step S15 occurs. The process proceeds to Return, and goes back to the upper level control flow. Then, the operation of the engine 1 is stopped, and this control flow of FIG. 4 is also stopped.

Next, an exhaust gas purification method for the exhaust gas purification system 10 of this first embodiment is described. This exhaust gas purification method is a method in which a purification ability of an exhaust gas purification device 13 is recovered by feeding a hydrocarbon L to an upstream side of the exhaust gas purification device 13, which is disposed in an exhaust path 12 of an engine 1, by exhaust passage direct injection from a hydrocarbon feed device 14 under a preset hydrocarbon feed condition and combusting the hydrocarbon L in an oxidation catalyst unit 13b constituting part of the exhaust gas purification device 13.

In this exhaust gas purification method, an activation threshold line A of the exhaust gas flow rate (or the intake air flow rate) is preset with respect to the exhaust gas temperature of the engine 1. Here, the activation threshold line A serves as a boundary between the misfire region Rb where the hydrocarbon L fed into the exhaust passage 12 cannot be combusted in the oxidation catalyst unit 13b and the active region Ra where the hydrocarbon L fed into the exhaust passage 12 can be combusted in the oxidation catalyst unit 13b.

In addition, an exhaust gas temperature and an exhaust gas flow rate (or the intake air flow rate) are found during control under the hydrocarbon feed condition. Then, it is determined whether the combination of the exhaust gas temperature and the exhaust gas flow rate (or the intake air flow rate) is within the active region Ra or the misfire region Rb. If the combination is determined to be within the active region Ra, the hydrocarbon L is fed, whereas when the combination is determined to be within the misfire region Rb, the feed of the hydrocarbon L is stopped.

According to the exhaust gas purification system 10 and the exhaust gas purification method of this first embodiment, the activation threshold line A for determining the start and the stop of the feed of the hydrocarbon L is set based on the combination of the exhaust gas temperature and the exhaust gas flow rate (or the intake air flow rate) not only the inlet exhaust gas temperature or the catalyst temperature of the exhaust gas purification unit 13a or 13b such as a DPF or an oxidation catalyst. Hence, the start and the stop of the feed of the hydrocarbon L can be determined more accurately than in a case where the start and the stop of the feed of the hydrocarbon L are determined based on only the temperature such as the exhaust gas temperature, because the misfiring phenomenon due to the exhaust gas flow rate (or the intake air flow rate) can be taken into consideration.

For this reason, the fed hydrocarbon L can be prevented from being left unburned and adsorbing into the exhaust gas purification units 13a and 13b constituting the exhaust gas purification device 13. Consequently, at a time point where a state is reached where the unburned hydrocarbon L can be combusted and the feed of the hydrocarbon L is resumed, unburned hydrocarbon L is not adsorbed on any of the exhaust gas purification units 13a and 13b. Hence, thermal runaway due to abnormal combustion of unburned and adsorbed hydrocarbon L can be suppressed, and the temperatures of the exhaust gas purification units 13a and 13b can be always maintained in a controllable state. In addition, it is possible to avoid delay in recovery of the purification ability of the DPF unit 13a in the exhaust gas purification device 13 due to shortage of the fed hydrocarbon L.

Next, an exhaust gas purification system 10A of a second embodiment is described. The exhaust gas purification system 10A of the second embodiment has the same configuration as that of the exhaust gas purification system 10 of the first embodiment, except for a configuration of the controlling device 16A.

The controlling device 16A of this exhaust gas purification system 10A of the second embodiment is configured to perform the following control. As shown in the table in FIG. 2 and in FIG. 5, an intermediate region Rc is set between the active region Ra and the misfire region Rb by providing an intermediate region width at the boundary between the active region Ra and the misfire region Rb, and a border line of the active region Ra side of the intermediate region Rc is employed as a feed start threshold line B, and a border line of the misfire region Rb side of the intermediate region Rc is employed as a feed stop threshold line C.

Figure 5:
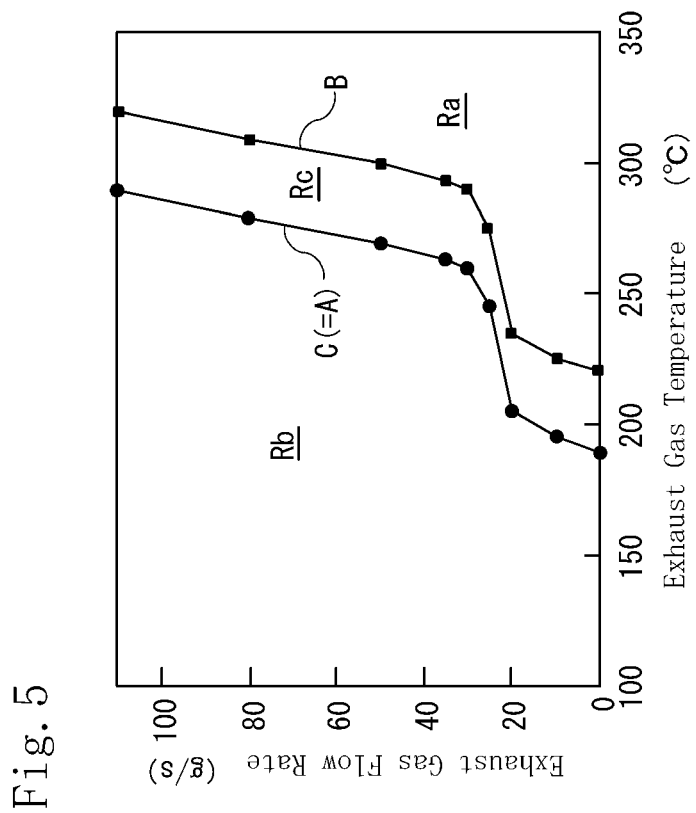
FIG. 5 shows an example of combinations of exhaust gas temperature and exhaust gas flow rate, an activation threshold line, a feed start threshold line, a feed stop threshold line, an active region, an intermediate region, and a misfire region in the form of a graph.
Figure 8:
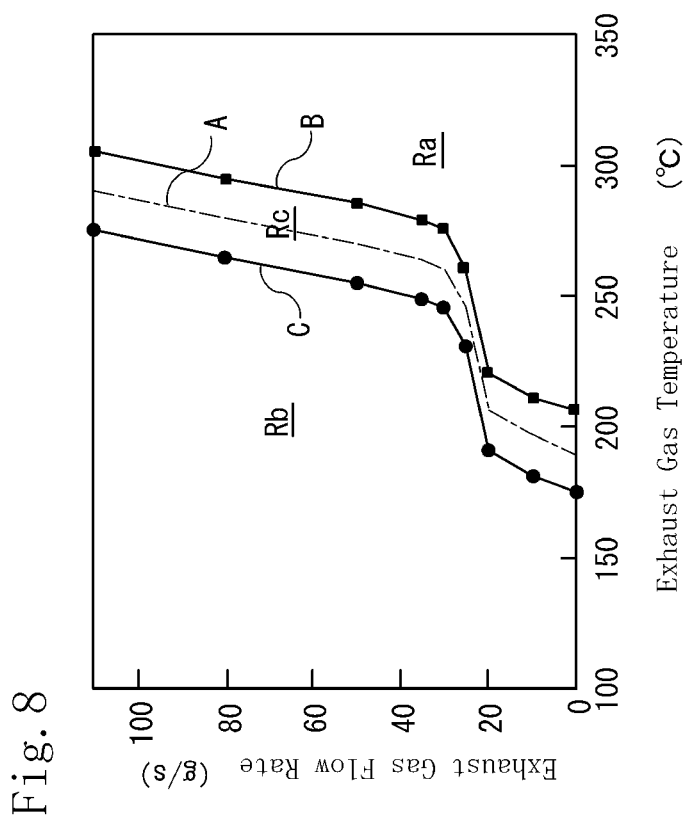
FIG. 8 shows another example of combinations of exhaust gas temperature and exhaust gas flow rate, an activation threshold line, a feed start threshold line, a feed stop threshold line, an active region, an intermediate region, and a misfire region in the form of a graph.

Note that, in the table of FIG. 2 and in FIG. 5, the feed stop threshold is set to the same as the activation threshold, and the feed start threshold is set with the intermediate region width being 30° C. However, as shown in FIGS. 7 and 8, the activation threshold may be located just halfway between the feed stop threshold and the feed start threshold, or the activation threshold may be located not just halfway between but between the feed stop threshold and the feed start threshold.

Note that FIG. 2 shows the activation threshold A, the feed start threshold B, the intermediate region width, and the feed stop threshold C. However, if two of them are available, the other two can be calculated. Hence, it is only necessary that two of them be available.

In addition, the following control is performed. Specifically, when the combination of the exhaust gas temperature and the exhaust gas flow rate (or the intake air flow rate) moves from the misfire region Rb side to the active region Ra side during control, it is decided to feed the hydrocarbon L at the time point where the combination passes the feed start threshold line B, and the hydrocarbon L is fed. On the other hand, when the combination moves from the active region Ra side to the misfire region Rb side, it is decided to stop the feed of the hydrocarbon L at the time point where the combination passes the feed stop threshold line C, and the feed of the hydrocarbon L is stopped.

Next, an exhaust gas purification method for the exhaust gas purification system 10A of the second embodiment is described. This exhaust gas purification method is a method in which a purification ability of an exhaust gas purification device 13 is recovered by feeding a hydrocarbon L to an upstream side of the exhaust gas purification device 13 disposed in an exhaust passage 12 of an engine 1 by exhaust passage direct injection from a hydrocarbon feed device 14 under a preset hydrocarbon feed condition and combusting the hydrocarbon L in an oxidation catalyst unit 13b constituting part of the exhaust gas purification device 13.

In this exhaust gas purification method, an activation threshold line A of exhaust gas flow rate (or intake air flow rate) is preset with respect to exhaust gas temperature of the engine 1. Here, the activation threshold line A serves as a boundary between a misfire region Rb where the hydrocarbon L fed into the exhaust passage 12 cannot be combusted in the oxidation catalyst unit 13b and an active region Ra where the hydrocarbon L fed into the exhaust passage 12 can be combusted in the oxidation catalyst unit 13b.

Moreover, an intermediate region Rc is set between the active region Ra and the misfire region Rb by providing an intermediate region width at the boundary between the active region Ra and the misfire region Rb, and a border line of the intermediate region Rc on the active region Ra side is employed as a feed start threshold line B, while a border line of the intermediate region Rc on the misfire region Rb side is employed as a feed stop threshold line C.

In addition, when the combination of the exhaust gas temperature and the exhaust gas flow rate (or the intake air flow rate) moves from the misfire region Rb side to the active region Ra side during control, the feed of the hydrocarbon L is started at the time point where the combination passes the feed start threshold line B, whereas when the combination moves from the active region Ra side to the misfire region Rb side, the feed of the hydrocarbon L is stopped at a time point where the combination passes the feed stop threshold line C.

Figure 6:
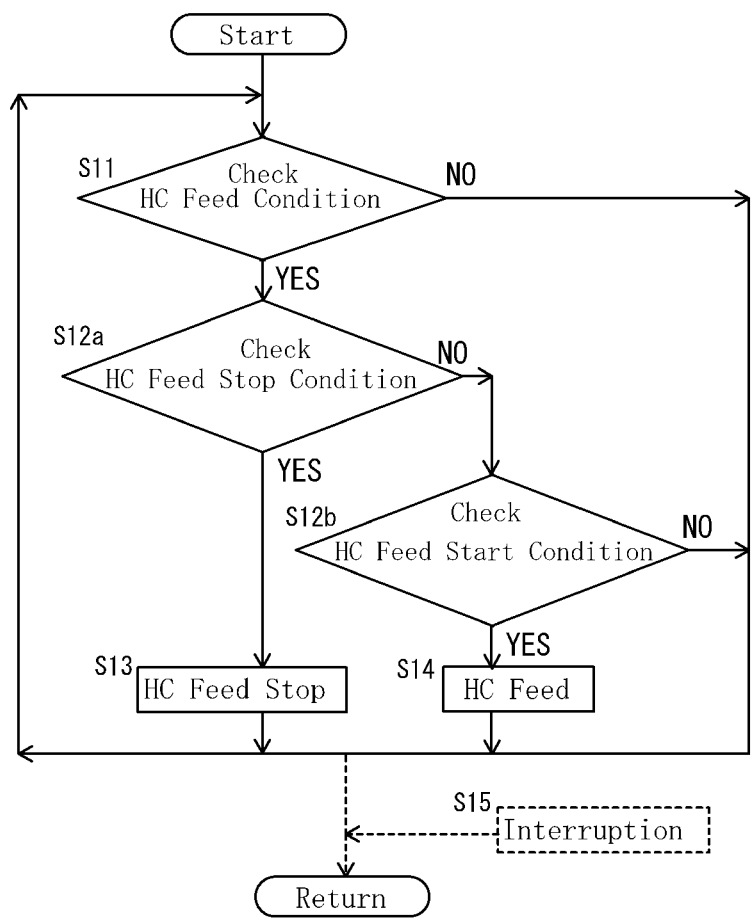
FIG. 6 shows an example of a control flow showing a flow of a control in an exhaust gas purification method of a second embodiment of the present invention.

This is described with reference to the control flow in FIG. 6. When the operation of the engine 1 is started, a control flow of FIG. 6 is also invoked by an upper level control flow and started. When the control flow is started, it is determined whether or not the state is under a hydrocarbon (HC) feed condition, in Step S11. When the state is not under a hydrocarbon feed condition, the process returns to Step S11, after a preset time (a time associated with intervals of determinations) has elapsed.

When the determination in Step S11 shows that the state is under the hydrocarbon feed condition, the process proceeds to Step S12a. In Step S12a, it is determined whether the state is under a hydrocarbon feed stop condition, i.e., whether the state is on the misfire region Rb side of the feed stop threshold line C (YES) or not (NO). When the state is on the misfire region Rb side of the feed stop threshold line C (YES), it is decided to stop the feed of the hydrocarbon L, and the process proceeds to Step S13, where the feed of the hydrocarbon L is stopped for a preset time (a time associated with intervals of determinations). On the other hand, the determination in Step S12a shows that the state is on the active region Ra side of the feed stop threshold line C (NO), the process proceeds to Step S12b.

In Step S12b, it is determined whether the state is in a hydrocarbon feed start condition, i.e., whether the state is on the active region Ra side of the feed start threshold line B (YES) or not (NO). When the state is on the active region Ra side of the feed start threshold line B (YES), it is decided to feed the hydrocarbon L, and the process proceeds to Step S14, where the hydrocarbon L is fed for a preset time (a time associated with intervals of determinations). On the other hand, when the determination in Step S12b shows that the state is on the misfire region Rb side of the feed start threshold line B (NO), the process returns to Step S11, after a preset time (a time associated with intervals of determinations) has elapsed while the current situation is being maintained.

These operations are repeated. When the engine 1 stops its operation, an interruption of Step S15 occurs. The process proceeds to Return, and goes back to the upper level control flow. Then, the operation of the engine 1 is stopped, and the control flow of FIG. 4 is also stopped.

More specifically, when the exhaust gas temperature changes from the high temperature side to the low temperature side while the exhaust gas flow rate is constant at 30 g/s, the feed of the hydrocarbon L is stopped at an exhaust gas temperature of 260° C. On the other hand, when the exhaust gas temperature changes from the low temperature side to the high temperature side, the feed of the hydrocarbon L is started at an exhaust gas temperature of 290° C. This is because the heat capacity of the oxidation catalyst unit 13b, i.e., the degree of difficulty of raising or lowering the temperature of the oxidation catalyst unit 13b is taken into consideration.

According to the exhaust gas purification system 10A and the exhaust gas purification method of the second embodiment, the progress of the state during control can be taken into consideration for determining whether the state (combination) during control is within the active region Ra or the misfire region Rb, in addition to the operations and effects of the exhaust gas purification system 10A and the exhaust gas purification method of the second embodiment. Hence, the feed of the hydrocarbon L can be controlled more accurately.

In addition, in each of the above-described first and second exhaust gas purification systems 10 and 10A, the controlling device 16 or 16A is preferably configured to further perform such a control that a preset start delay time is allowed to elapse between the decision to feed the hydrocarbon L made based on the combination of the exhaust gas temperature and the exhaust gas flow rate (or the intake air flow rate) during the control and the start of the feed of the hydrocarbon L, and to perform such a control that a preset stop delay time is allowed to elapse between the decision to stop the feed of the hydrocarbon L and the stop of the feed of the hydrocarbon L.

In other words, in each of the above-described first and second exhaust gas purification methods, it is preferable that a preset start delay time be allowed to elapse between the decision to feed the hydrocarbon L made based on the combination of the exhaust gas temperature and the exhaust gas flow rate (or the intake air flow rate) during the control and the start of the feed of the hydrocarbon L, and that a preset stop delay time be allowed to elapse between the decision to stop the feed of the hydrocarbon L and the stop of the feed of the hydrocarbon L.

To put it differently, the feed of the hydrocarbon L is started after a certain time (the start delay time) has elapsed from a time point at which the exhaust gas flow rate (or the intake air flow rate) becomes not higher than the threshold (A or B) with respect to the exhaust gas temperature, and the feed of the hydrocarbon L is stopped after a certain time (the stop delay time) has elapsed from a time point at which the exhaust gas flow rate (or the intake air flow rate) becomes not lower than the threshold (A or C). Conversely, the feed of the hydrocarbon L is started after a certain time (the start delay time) has elapsed from a time point at which the exhaust gas temperature becomes not lower than the threshold (A or B) with respect to the exhaust gas flow rate (or the intake air flow rate), and the feed of the hydrocarbon L is stopped after a certain time (the stop delay time) has elapsed from a time point at which the exhaust gas temperature becomes not higher than the threshold (A or C).

This configuration and method make it possible to perform the control into which the delay time is introduced by taking the heat capacity of the oxidation catalyst unit 13b in which the fed hydrocarbon L is combusted into consideration in determining whether the state (combination) during control is within the active region Ra or the misfire region Rb and perform the start or the stop of the feed of the hydrocarbon L. Hence, the feed of the hydrocarbon L and the stop of the feed of the hydrocarbon L can be performed at more appropriate timings.

The exhaust gas purification systems 10 and 10A and the exhaust gas purification methods of the first and second embodiments which have the above-described configuration make it possible to prevent the hydrocarbon L from being adsorbed into the exhaust gas purification units 13a and 13b, and maintain the temperatures of the exhaust gas purification units 13a and 13b always in a controllable state.

Hence, in a vehicle on which the engine 1 employing the exhaust gas purification system 10 or 10A is mounted, a forced regeneration control of particulate matter (PM) collected by the DPF 13a, forced regeneration and desulfurization controls involving an air-fuel ratio rich control for recovery of a purification ability of a lean NOx trap catalyst (LNT) catalyst, or a NOx reduction control by a hydrocarbon selective reduction catalyst (HC-SCR catalyst) can be performed in a stable temperature state even in an operation where the vehicle is switched from deceleration to acceleration.

Note that when the exhaust gas purification unit is an exhaust gas purification unit in which a hydrocarbon selective reduction catalyst is supported, the preset hydrocarbon feed condition is a condition for removing NOx in the exhaust gas G, and the exhaust gas G is purified by reduction of NOx in the exhaust gas G with the fed hydrocarbon (HC) L.

In an exhaust gas purification system in which a purification ability of an exhaust gas purification device is recovered or exhaust gas is purified, by feeding a hydrocarbon to an upstream side of the exhaust gas purification device, which is disposed in an exhaust path of an internal combustion engine, by post injection or the like under a preset hydrocarbon feed condition and combusting the hydrocarbon in an exhaust gas purification unit such as a catalyst, the exhaust gas purification system and the exhaust gas purification method of the present invention make it possible to prevent the hydrocarbon from being adsorbed into the exhaust gas purification unit and maintain the temperature of the exhaust gas purification unit always in a controllable state. Hence, the exhaust gas purification system and the exhaust gas purification method of the present invention can be used as an exhaust gas purification system and an exhaust gas purification method for an internal combustion engine mounted on an automobile or the like.

The invention claimed is:

1. An exhaust gas purification system comprising:
   an exhaust gas purifier having a catalyst and being disposed in an exhaust passage of an internal combustion engine; and
   a controller being configured to
   perform a control for recovering a purification ability of the exhaust gas purifier or a control for purifying exhaust gas, by feeding into the exhaust passage a hydrocarbon to an upstream side of the exhaust gas purifier by in-cylinder post fuel injection or exhaust passage direct injection under a preset hydrocarbon feed condition, and combusting the hydrocarbon in the exhaust gas purifier,
   preset an activation threshold line of exhaust gas flow rate or intake air flow rate with respect to an exhaust gas temperature of the internal combustion engine, the activation threshold line serving as a boundary between an active region where the hydrocarbon fed into the exhaust passage is combusted in the exhaust gas purifier and a misfire region where the hydrocarbon fed into the exhaust passage is absorbed by the catalyst and cannot be combusted in the exhaust gas purifier,
   find an exhaust gas temperature as well as an exhaust gas flow rate or an intake air flow rate during the preset hydrocarbon feed condition,
   determine whether a combination of the exhaust gas temperature with the exhaust gas flow rate or the intake air flow rate is within the active region or the misfire region, and
   if the combination is determined to be within the active region, it is decided to feed the hydrocarbon, and the hydrocarbon is fed, whereas if the combination is determined to be within the misfire region, it is decided to stop the feed of the hydrocarbon, and the feed of the hydrocarbon is stopped.

2. The exhaust gas purification system according to claim 1, wherein the controller is further configured to
   set an intermediate region between a side of the active region and a side of the misfire region by providing a border on the active region side as a feed start threshold line and a border on the misfire region side as a feed stop threshold line, and
   when the combination of the exhaust gas temperature with the exhaust gas flow rate or the intake air flow rate moves from the misfire region side to the active region side, it is decided to feed the hydrocarbon at a time point where the combination passes the feed start threshold line, and the feed of the hydrocarbon is started, whereas
   when the combination moves from the active region side to the misfire region side, it is decided to stop the feed of the hydrocarbon at a time point where the combination passes the feed stop threshold line, and the feed of the hydrocarbon is stopped.

3. The exhaust gas purification system according to claim 2, wherein
   the controller is further configured to
   allow a preset start delay time to elapse between the decision to feed the hydrocarbon and the start of the feed of the hydrocarbon, and
   allow a preset stop delay time is allowed to elapse between the decision to stop the feed of the hydrocarbon and the stop of the feed of the hydrocarbon.

4. The exhaust gas purification system according to claim 1, wherein the controller is further configured to
- allow a preset start delay time to elapse between the decision to feed the hydrocarbon and the start of the feed of the hydrocarbon, and
- allow a preset stop delay time to elapse between the decision to stop the feed of the hydrocarbon and the stop of the feed of the hydrocarbon.

5. An exhaust gas purification method in which a purification ability of an exhaust gas purifier having a catalyst is recovered or exhaust gas is purified in the exhaust gas purifier, by feeding into an exhaust passage a hydrocarbon to an upstream side of the exhaust gas purifier, which is disposed in an exhaust passage of an internal combustion engine, by in-cylinder post fuel injection or exhaust passage direct injection under a preset hydrocarbon feed condition, and combusting the hydrocarbon in the exhaust gas purifier, the method comprising:
- presetting an activation threshold line of exhaust gas flow rate or intake air flow rate with respect to exhaust gas temperature of the internal combustion engine, the activation threshold line serving as a boundary between an active region where the hydrocarbon fed into the exhaust passage is combusted in the exhaust gas purifier and a misfire region where the hydrocarbon fed into the exhaust passage is absorbed by the catalyst and cannot be combusted in the exhaust gas purifier,
- finding an exhaust gas temperature as well as an exhaust gas flow rate or an intake air flow rate during the preset hydrocarbon feed condition,
- determining whether a combination of the exhaust gas temperature with the exhaust gas flow rate or the intake air flow rate is within the active region or the misfire region, and
- if the combination is determined to be within the active region, deciding to perform the feed of the hydrocarbon, and feeding the hydrocarbon,
- whereas if the combination is determined to be within the misfire region, deciding to stop the feed of the hydrocarbon, and stopping the feed of the hydrocarbon.

6. The method according to claim 5, further comprising:
setting an intermediate region between a side of the active region and a side of the misfire region by providing a border on the active region side as a feed start threshold line and a border on the misfire region side as a feed stop threshold line, and
when the combination of the exhaust gas temperature with the exhaust gas flow rate or the intake air flow rate moves from the misfire region side to the active region side, deciding to feed the hydrocarbon at a time point where the combination passes the feed start threshold line, and the feed of the hydrocarbon is started,
whereas when the combination moves from the active region side to the misfire region side, deciding to stop the feed of the hydrocarbon at a time point where the combination passes the feed stop threshold line, and stopping the feed of the hydrocarbon.

7. The method according to claim 5, further comprising:
allowing a preset start delay time to elapse between deciding to feed the hydrocarbon and the starting of the feed of the hydrocarbon, and
allowing a preset stop delay time to elapse between deciding to stop the feed of the hydrocarbon and the stopping of the feed of the hydrocarbon.

* * * * *